(12) United States Patent
Butt et al.

(10) Patent No.: US 6,754,829 B1
(45) Date of Patent: Jun. 22, 2004

(54) CERTIFICATE-BASED AUTHENTICATION SYSTEM FOR HETEROGENEOUS ENVIRONMENTS

(75) Inventors: Alan B. Butt, Orem, UT (US); Paul B. Hillyard, Lindon, UT (US); Jin Su, Orem, UT (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/461,157

(22) Filed: Dec. 14, 1999

(51) Int. Cl.[7] ............................. G06F 11/30; H04L 9/00
(52) U.S. Cl. ..................... 713/200; 713/201; 713/202; 713/175; 713/182
(58) Field of Search ............................... 713/200, 201, 713/202, 175, 182

(56) References Cited

U.S. PATENT DOCUMENTS

| | | | | |
|---|---|---|---|---|
| 5,944,824 | A | * | 8/1999 | He ............................ 713/201 |
| 6,088,805 | A | * | 7/2000 | Davis et al. ................ 713/202 |
| 6,275,941 | B1 | * | 8/2001 | Saito et al. ................. 713/201 |
| 6,421,781 | B1 | * | 7/2002 | Fox et al. ................... 713/201 |

* cited by examiner

Primary Examiner—Emmanuel L. Moise
(74) Attorney, Agent, or Firm—Steven D. Yates

(57) ABSTRACT

In one embodiment, methods and apparatus for an operator of a console to authenticate to a system of heterogeneous computers by logging in only once to a representative computer or "core". After logging in, the operator acquires a session certificate (e.g., an X.509-based certificate), allowing the operator to prove identity and group membership information to other nodes on a network. The core, before signing session certificates, embeds data in an extended data area of the certificates. The extended data includes the operator's username and groups to which the operator belongs, and possibly other information such operator context (or domain). The username, group membership, and other extended data is based on the namespace of the core computer, and other devices on the network need not belong to that namespace or even use the same network operating system. Manageable devices can authenticate and authorize access to themselves based on the extended data submitted to them by the bearer of a session certificate. Authenticity and ownership of the certificate is verified using standard public key cryptosystem methods. In some embodiments, manageable devices verify operator authorization by cross-referencing operator identity and group membership information in the certificate with an appropriate access control list (or equivalent data structure). In some embodiments, manageable devices are pre-configured to trust at least one core by giving it the public key of the core, and the core can direct the manageable device to trust other cores.

18 Claims, 8 Drawing Sheets

CERTIFICATE-BASED AUTHENTICATION SYSTEM FOR HETEROGENEOUS ENVIRONMENTS

FIELD OF THE INVENTION

The invention generally relates to providing remote-access to manageable devices across different operating systems, and more specifically, to using certificates with embedded cryptographic data to validate operator identity and access rights to remotely manageable devices.

BACKGROUND

With the advent of low-cost computers and computing devices, typical corporations have hundreds or thousands of such systems. This results in significant maintenance and support requirements. For example, for traditional computer systems, typical maintenance and support includes checking (testing and validating) installed software, application program upgrades, performing hardware diagnostics, system resets, and the like. If every computer in a corporation has to be personally visited by a technician to perform routine maintenance, then significant resources are required.

In an effort to reduce such requirements, various remote management suites have been developed. The term "management suite" means a combination of hardware and software tools for managing and maintaining networked manageable devices (e.g., computer systems, printers, or other hardware or software responsive to the management suite). One exemplary remote management system is the Intel® LANDesk® Management Suite by Intel Corporation of Santa Clara, Calif. The Intel suite provides operations such as hardware, software, and configuration file inventory and monitoring; remote control; remote diagnostics; software distribution; software metering; server management; etc.

However, a common problem with management suites is that they are not designed to operate within heterogeneous environments, such as mixtures of Windows 9x, Windows NT, Macintosh, Unix, Linux, Sun, etc operating systems. In particular, management suites are currently limited by their ability to validate one's right to perform a management action. Different operating systems track different user-related information and use different methods to store the tracked data. This can prevent interoperation between a management suite designed for a Unix environment and one designed for a Macintosh environment.

For example, management suites attempt to determine a console operator's identity (e.g., a network administrator seeking to control a manageable device), and then grant the operator rights accordingly. The term "console" refers to a device (or program) attempting to manage another device (or program). An "operator" is a user or program executing with the credentials of a particular user identity (e.g., a Unix set user-ID (SUID) program). Identity determination is different for different operating systems. This difference can prevent proper operator identification in heterogeneous environments.

In addition, some management operations, like remote control, require network operating system specific user account information, such as user access rights (e.g., access control lists) in order to perform the remote control operations. Such information is not accessible by identical means in different operating system environments. Even if different operating systems provide corresponding functionality, such as implementing the concept of access control lists or group memberships, the corresponding functionality may not be equivalent functionality. For example, different operating system implementations may be significantly limited or constrained in differing environments. If non-common features are necessary to perform the function, then the function is not portable across the differing operating systems. One such example are access control lists. Although well-known, access control lists are extensible under Unix, but not under Windows 95; under Windows 95 user groups and access control only exists in coordination with other network agents (such as a Windows NT domain controller). Stand-alone Windows 95 computers have no operating system level access control. Under Windows NT, user groups and access control lists exist and the membership rules are quite flexible. However, the operating system only applies access control to certain pre-defined objects like files, shares, and printers. The operating system does not enforce access control to objects outside of the pre-defined set (such as remote control). Even if such access control list support was available on all manageable device platforms, authentication and authorization based a network operating system user account identity requires both controller and manageable device to be logged into the same network operating system, file server, domain, NDS tree, etc. This is inconvenient in a heterogeneous networked environment.

SUMMARY

An operating system independent method for an operator of a console to manage a device. An operating system independent session certificate is obtained by the operator of the console executing a first operating system, from a trusted core of the device executing a second operating system, to authenticate identity and group membership of the operator. The operating system independent session certificate is provided by the operator to the device executing a third operating system, along with a management request. And, the device determines whether the authenticated operator has necessary access privilege to perform the management request based at least in part on the authenticated group membership of the operator set forth in the operating system independent session certificate.

BRIEF DESCRIPTION OF THE DRAWINGS

Features and advantages of the invention will become apparent to one skilled in the art to which the invention pertains from review of the following detailed description and claimed embodiments of the invention, in conjunction with the drawings in which:

DETAILED DESCRIPTION

To overcome difficulties inherent to incompatible operating system data and communication formats, disclosed is a method including a network operating system independent authentication/authorization mechanism that does not require storage and maintenance of per-operator certificates.

In one embodiment, the invention provides an operating system independent, certificate-based security model, allowing an operator of a console to authenticate to and manage a device. There are generally three entities at work: a manageable device, an operator of a console seeking to manage the manageable device, and an authority validating the legitimacy of the operator to the manageable device (see FIG. 1). The certificate-based security model can be embedded into a management suite, such as Intel LANDesk®, or other management suites, to allow console operators, cores, certificate authorities, and manageable devices can be logged into separate servers and/or domains managed by different operating systems.

As used herein, a "core" is a service center or computing device on which certain management services reside and/or execute, e.g., a core can perform functions provided by the management suite. The term "authentication" refers to the ability of a core or manageable device to positively identify an entity attempting to access them. For example, a core can authenticate a console operator through verifying successful login of the operator into the core's operating system.

The phrase "access control" refers to determining whether to allow an operator to access specific functionality available on a manageable device. Access control is implemented using access control lists stored on the manageable device. In one embodiment, valid operations are determined according to an operator's group membership as tracked within the core. The term "list" is a generic data-structure reference, and is intended to include other storage formats (e.g., databases, etc.).

The phrase "certificate authority" refers to an entity that creates and signs certificates for operators that have authenticated themselves to the core. In one embodiment, certificate authorities perform traditional certificate services, such as certificate database services, certificate lookup services, revocation services, etc. In another embodiment, authorities only generate certificates, and each core is responsible to implement policy-based management effecting traditional certificate services.

Figure 1:
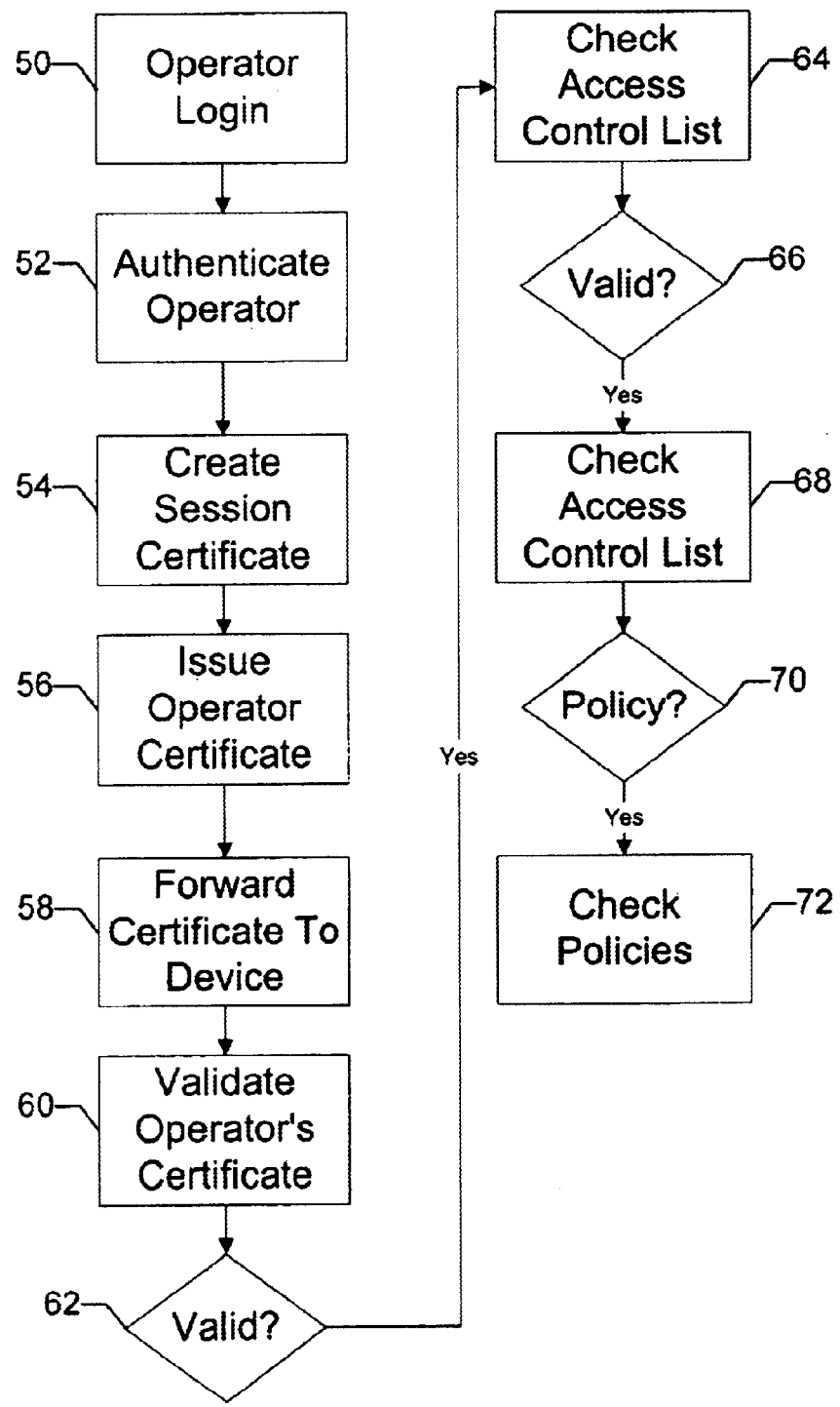
FIG. 1 illustrates a general overview of one embodiment of the invention.

FIG. 1 illustrates a general overview of one embodiment of the invention.

Generally, an operator of a console first authenticates 52 to a core by "logging in" 50 to the core system. This authentication is typically in the form of the operator submitting a username and password pair. After the core validates the credentials it uses a certificate authority to create 54 a session certificate for the console operator (using a public key submitted by the operator).

Note that the core has a certificate, issued by the certificate authority, that is trusted by all manageable device nodes. The core uses this certificate for signing other certificates that it grants to console operators. The core issues 56 the newly created session certificate to the console operator. The session certificate contains special account information for the operator, based on the operating system of the core. This information includes the username used to authenticate to the core as well as any of the core's user groups that include this username. Although this information can be specific to the operating system and namespace of the core, potential manageable device computers do not need to belong to the namespace in order to properly use this information to authenticate or authorize actions by the console operator.

The console operator can then forwards 58 a core-signed session certificate to a manageable device the console operator wishes to manage. Operator identity and group membership is transmitted to the manageable device inside of the signed session certificate. This allows a manageable device to conveniently determine access privileges based on operator group data originally in a namespace unknown or foreign to the device. Group membership information is gathered from the current information available at the core when the session certificate was created. In one embodiment, session certificates have short lifetimes so that group information stored within certificates does not become stale.

The manageable device validates 60 authenticity and operator ownership of the submitted session certificate. This validation includes verifying that the operator has the private key associated with the certificate by checking the digital signature of commands or challenged requests. If 62 the certificate is validated, the manageable device checks 64 the account information embedded in the certificate to the access control list governing access to the requested feature. In this embodiment, access control features requires each manageable device to maintain per-feature access control lists. The access control lists include at least lists of usernames and groups that can access specified features. In one embodiment, the lists are composed of strings (e.g., ASCII strings, or equivalent), however, other coding formats can be used. Manageable devices search appropriate access control list lists for any string found in the identity section of the submitted certificate. If there is a match, then an operator is deemed authorized to perform the requested operation.

Manageable devices may have local policies that restrict access control list entries and provide for locally-determined limitations to otherwise authorized console operator activities. If 66 the operator has valid access, a check is made to determine if policies are being used. If 68 policies are being used, then the operator is checked 70 against the local policies. For example, if an operator requests to backup a manageable device's file system, the request is only granted if the operator is listed in an appropriate access control list, e.g., "Backup Operators". Access can also be granted by having at least one of the operator's user groups listed in the access control list. In addition, as discussed below, even if an operator is a member of an appropriate group, the manageable device may have a local policy for checking access control lists restricting operations that are otherwise valid. For example, the device may be a "mission critical" device, and therefore have a local access control list disallowing all remote management attempts to reboot the device (an uncontrolled reboot may be costly), even though an operator may otherwise have authority to perform device reboots.

Allowing per-machine access control list granularity is beneficial, since operators are prevented from obtaining global access to all machines. That is, if authorizations were stored in the certificate, then an operator that has the right to perform a particular operation could perform this particular operation on any device-regardless of permachine policies.

In one embodiment, the certificates are X.509 (see FIG. 3) based certificates, which those skilled in the art will appreciate as being operating system independent. Operator identity and group affiliations can be incorporated into the certificates. In one embodiment, the Operator identity and group affiliations are stored within the "extended data area" of the certificate. Since the X.509 certificate format is well-known and recommended by the International Telecommunication Union (ITU), it can be used as a common communication medium between otherwise incompatible operating systems, and thus facilitate validating an attempt to manage a particular manageable device.

In one embodiment, sessions can be stored/embedded within a document, file, or set of files. The package is then digitally signed using the private key and regular digest algorithm. The digital signature insures the integrity of the package (e.g., it cannot be altered without detection). Although such a session certificate is useful only for the existence of operations performed with the package, it can be assigned a long (e.g., years) validity duration, and allow for deferred deployment. Authentication of such certificates is as discussed herein for other certificates. Proof of ownership of the private key associated with the certificate is verified by checking the digital signature. Authorization of the operations performed by the package is performed in manner described above. And, if the identity in the certificate matches the appropriate access control lists, then the package creator is (was) authorized to perform operations of the package. (Intel's LANDesk® policy configuration and software distribution mechanisms are examples of the use of stored sessions. Remote control and Point to Point configuration are examples of live sessions.)

Figure 2:
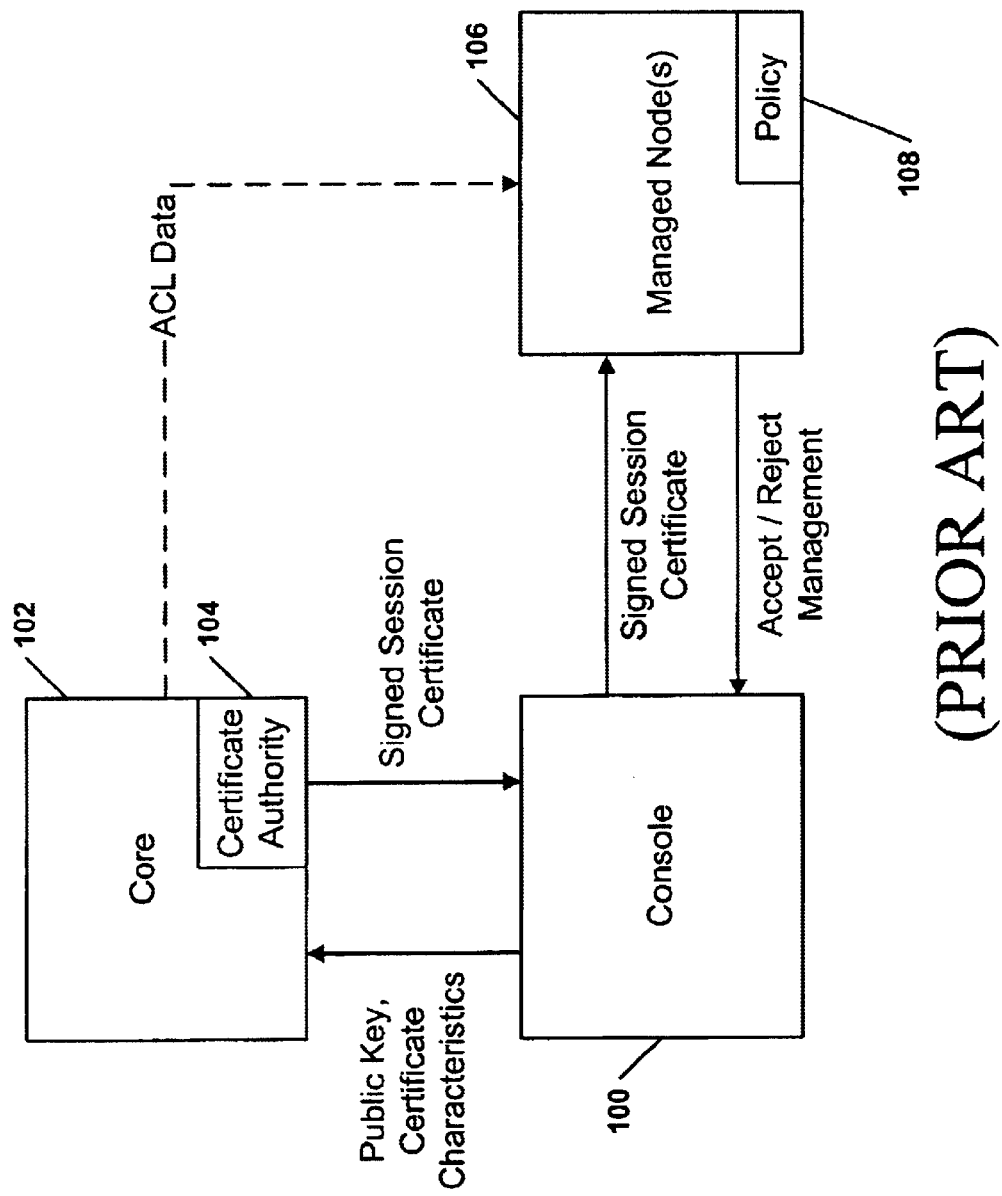
FIG. 2 illustrates a basic authentication arrangement.

FIG. 2 illustrates an authentication arrangement for one embodiment of the invention. Shown are a console computing device (console) 100, a core 102 computing device, a certificate authority (authority) 104, and a manageable device 106.

Although only one manageable device 106 is illustrated, it is understood that many such will be present in a typical networked environment. The console is typically a computing device in use by an operator, where the operator seeks to manage the manageable device 106. The core 102 and certificate authority 104, as discussed below, allow the manageable device to validate the operator of the console, as well as any actions attempted by the operator. As illustrated, the core 102 and certificate authority 104 may be present within a single computing device, or they may be embodied in separate devices that are in communication with each other.

As illustrated, there is also a link 110 between the core 102 and manageable device(s) 106 for transmitting access control list information to the manageable device(s). Typically, this information transfer occurs prior to an attempt by a console operator to access the manageable device, and includes pre-arranging for the manageable device(s) to trust the Certificate Authority 104.

The core 102, by way of the certificate authority 104, issues operating system independent certificates to operators of consoles (e.g., console 100) which authenticate the identity of the console operators. As discussed above, the certificates embed a console operator's identity and group membership in the certificate, where access rights (in the form of access control lists) are stored at the manageable device(s) 106. The console operator proffers the certificate to a manageable device in support of a request to perform some management function. A manageable device 106, after receiving and validating the certificate, matches up the identity information within the certificate with the manageable device's local access control list information.

In one embodiment, existing network operating system operator-account management and authentication capabilities are utilized to avoid administering parallel name spaces (e.g., one for the network operating system, and one for the management suite). Manageable devices 106 and console operators log into separate servers or domains, and contact the core 102 over the network. The operator submits a username and password to the core. The core 102 then queries its local operating system and confirms the validity of the account and password. If so, the Certificate Authority 104 can safely create a certificate on behalf of the operator and place the operator's account name and associated user groups inside the certificate. Once a console 100 operator has been authenticated to the core 102, the core maintains session information about the operator to allow the core to impersonate the operator if needed. This allows the core to automatically authenticated future requests made by the operator (within a specified time-out period).

In one embodiment, the console operator provides username and password information to the core by logging into a special web form. (It is understood that rather than using a form to gather username and password information, instead Java, JavaScript, dynamic hypertext markup language (DHTP), and other web-related techniques may be used to acquire this data.) Once this data is acquired, the web server completes authentication of the operator by checking its operating system to confirm that the specified username and password exists in its namespace.

In one embodiment, group membership is determined by records maintained by the core's 102 own operating system. In addition, role memberships can be also created at the core and transmitted to individual manageable devices. Different devices can have different role membership lists. For example, assume a "CanRemoteControl" role exists on each manageable device. On more secure manageable devices, the members of that role (both groups and user accounts) may only contain trusted individual and user groups. Less secure devices may contain less trusted entries for users and groups. Thus, less trusted operators may be allowed to use less secure operating systems, and only high-level operators will be able to access a secure operating system.

In one embodiment, standard network operating system application programming interface (API) calls are used by the core 102 computing device to validate console operator connections. In this embodiment, the core 102 is hosted on a computing device that has network operating system identification and authentication APIs available. As illustrated, the core is acting as a simple certificate authority granting X.509-based certificates to console operators. Core-issued certificates are called session certificates. Certificates include public-key or equivalent encryption technology to allow manageable device-validation of a session certificate. Each certificate operates as a digital equivalent of an identification card, and includes the public key of its owner. It has been signed by a certificate authority 104 trusted by the manageable device 106.

The owner of a certificate presents the certificate to a manageable device. The manageable device authenticates the certificate owner by using standardized encryption algorithms, e.g., the manageable device must trust the certificate authority, which created the certificate (it holds the public key for the certificate authority in a special "trusted certificate" list). It must use the key in the trusted certificate to validate the signature of the session certificate. Once the certificate is validated, the manageable device must verify that the certificate owner has the private key for the session certificate. It does this by challenging the owner to encrypt or sign a random sequence using the private key, and then decrypting the response with the public key found in the certificate. In another embodiment, the manageable device can require that requests be digitally signed using the private key associated with the session certificate. In this embodiment, the "challenge" or signing of random data does not need to be performed as the requester proves possession of the private key with each signed request.

Signing certificates (used by the certificate authority 104 to create session certificates) can be created by an outside entity, such as VeriSign Corporation, by the core itself, or by a second core, and then imported. No matter how the signing certificate is created, each manageable device must be pre-configured to trust the signing certificate. This can be done at manageable device installation time. By trusting a signing certificate, a manageable device is agreeing to trust any "session certificates" which are created by the owner of the "signing certificate." This means that a manageable device agrees to trust the authenticity of any console operators that contact it after logging into the core which owns the trusted "signing certificate." Associated with certificates are "public" and "private" keys, which are part of a "reversible" public-key encryption system, where data encrypted or signed with either key can be decoded or validated only with the other key. The public key is embedded within the certificate, and the private key is carefully stored and protected by the owner of the certificate.

Once a console operator receives a session certificate from a certificate authority 104, it can prove its ownership of the certificate to any manageable device by responding to challenges from the device with its own private key, or by signing requests with the private key. In one embodiment, a manageable device 106 can trust more than one core 102. It does this by maintaining a list of trusted certificates. In addition to the subject information, certificates contain issuer information. The issue information identifies the core that created the certificate. The issuer information is used to find the certificate of the trusted core in the trusted certificate list. When contacted by a core or console operator, the manageable device simply verifies that the presented session certificate has been signed by the private key corresponding to the trusted certificate identified by the issuer information in the session certificate.

In one embodiment, trusted cores 102 maintain a list of other trusted cores, and direct manageable devices 106 to trust these other cores. A trusted core does this by instructing the manageable device to add a certificate to it's "trusted certificate list." The manageable device agrees to add the new certificate to its "trusted certificate list" because it already trusts the core that is making the request. Note that this presumes manageable devices have installed within then at least one public key for a trusted core. This initial trust arrangement can be accomplished during initial installation of software on the manageable device.

In another embodiment, a user of a manageable device uses a web browser to contact a web site containing a link which causes a trust certificate to be installed on the manageable device. In another embodiment, a user can receive an e-mail containing a trust certificate to install. In each of these acquiring-trust arrangements, it is expected that a user of the manageable device is provided the option of whether to allow the manageable device to trust a particular core. Once the decision is made, the device will automatically authenticate any communication from the newly trusted core or from a console that has received a session certificate from the core.

Figure 3:
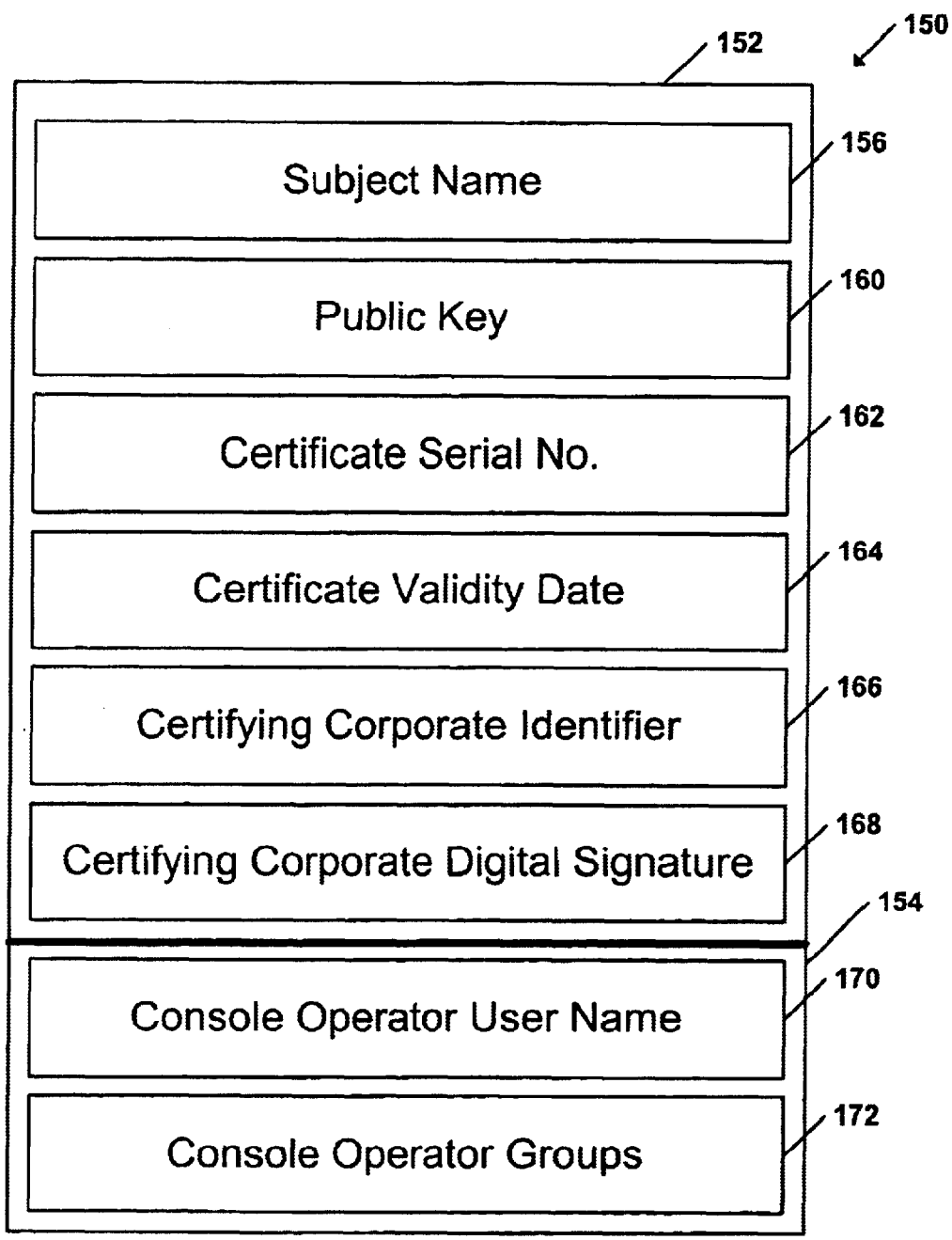
FIG. 3 illustrates a prior art session certificate.

FIG. 3 illustrates an exemplary session certificate 150. Traditional X.509 certificate content 152 is extended to contain operator specific data 154 (e.g., items 170 and 172 in this embodiment).

Traditional certificate content includes the Subject Name 156, public key 160, certificate serial number 162 (this can be used by the certifying authority to look up the certificate), certificate validity date 164, certificate authority (e.g., issuer) identifier 166, and a digital signature 168 for the certifying authority. The digital signature is a private key (in a public key cryptosystem) encryption of the digest computed on the contents of the certificate. This signature can be validated by anyone holding the associated public key for the private key. (For more information regarding the contents and applications of X.509 certificates, please see the X.509 standard referenced above.)

The extended data 154 includes a username and group membership for that name. This information is placed in the certificate by the certificate authority 104, and is based on the namespace of the core 102. As discussed above, when the manageable device is presented a certificate, and after it validates the certificate, it compares the username and group membership information to an access control list to determine whether to allow operations requested by the operator. (Exclusion access control lists may also be used, where manageable devices deny access if a match is found between a username or a group name and the exclusion list.)

Group membership 172 does not imply any particular access privileges on individual manageable devices. Group membership is simply a way to further describe a console operator (by adding more unique attributes to the operator). Any individual attribute of an operator found in the certificate (either the username or an individual group name) can be referenced in one or more access control lists at the manageable device to determine access privileges.

For simplicity, it is assumed that the manageable device receives a certificate signed by a core for which the manageable device already has a public key. However, other arrangements are contemplated, such as requesting a known core to query unknown to the manageable device, but trusted by the known core, to locate the public key for the core signing the received certificate.

In one embodiment, a manageable device's trusted certificates are maintained by a policy distribution system 108 (FIG. 1) (e.g., as provided by LANDesk®). This distribution system can also provide access control lists to each manageable device.

Figure 4:
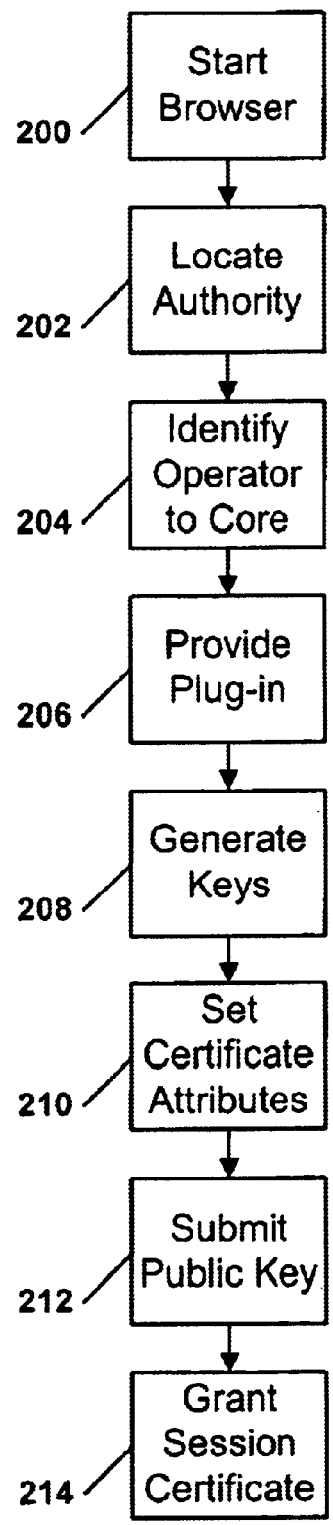
FIG. 4 is a flowchart, from the perspective of a console, for a console operator to obtain a session certificate from a core.

FIG. 4 is a flowchart for a console operator, in one embodiment of the invention, to obtain a session certificate from a core. It is assumed the core is running a web server, and after the operator successfully logs into the console, the illustrated operations are performed by the operator using an Internet web browser.

The console operator launches a Web browser or the administrative console in 200. Then the console identifies and establishes a session with 202 a trusted core/certificate authority responsible for a manageable device. This information can be obtained from a database associating authorities and manageable devices, and or by direct communication with the device.

The core then requests credentials from the console operator, and the operator is identified 204 by transferring the credentials over the established session between the console and core 204. Typically, this is performed as a username and password based login.

Assuming a web browser is used to contact and authenticate to a web browser running on the core, after authentication, the browser downloads 206 a plug-in to be executed by the browser of the operator's console. (It is understood that other network application programs, e-mail based systems, or proprietary programs, may also be used to authenticate the console operator.) Visiting the core's home page causes the plug-in to be transparently downloaded to the operator's console. Java, JavaScript, or other browsersupported languages may be used to implement the functionality of the plug-in on the browser. This plug-in may also be cached for use in subsequent accesses to the core. For Microsoft Internet Explorer (and compatible network application programs), the plug-in may be an ActiveX control embedded in the core's home page.

The plug-in immediately begins generating 208 a cryptographic public/private key pairing. The key pair is cached in memory and not physically written to disk or other permanent storage. The plug-in generates this key pair as a preliminary step to requesting a session certificate from the core. The console will only request a session certificate if it needs to contact and authenticate to a manageable device, but because key pair generation can be time consuming, the plug-in immediately begins generating the key pair in the background. Prior to any attempt to authenticate to a manageable device, manageable device the console submits 210 the public key of the pairing to the core as a session certificate request. In one embodiment, this information is sent to the core over an authenticated channel Because the core's web server is maintaining session information for the operator, it knows that the operator is already authenticated to the core. Based on this authentication, it acts as a certificate authority and grants 212 the console operator's request for a certificate. The certificate is based on the X.509 format (see FIG. 2). The certificate contains the console operator's username and group membership information, based on the namespace of the core. The returned certificate is then stored by the plug-in at the console for presentation to a manageable device as required.

In one embodiment, the core only grants session certificates to authenticated operators, and session certificates are created on-the-fly, and then destroyed once an operator's session with the manageable device has terminated. (Short lived certificates removes need for certificate authority maintenance (e.g., revocation, etc.).) And, since the key pairs are cached in memory, once a console session terminates, the certificate (and its private key) is automatically lost.

Figure 5:
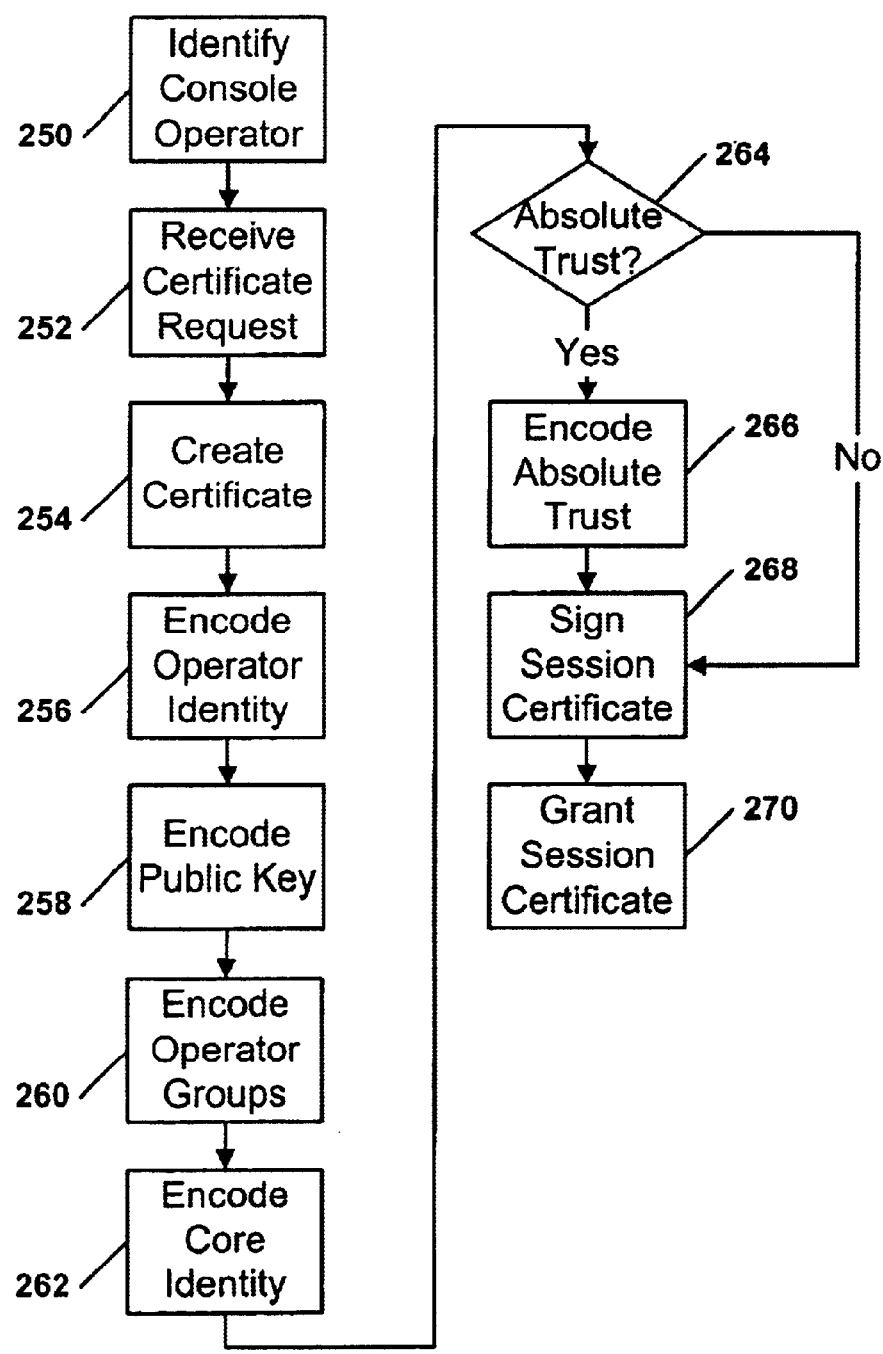
FIG. 5 is a flowchart, from the perspective of a core, for creating a session certificate by a certificate authority associated with the core.

FIG. 5 is a core-centric flowchart for creating a session certificate. The core first identifies 250 the console operator through the standard login process. Although this typically means an operator logging into the core via the console, other identification methods, e.g., bio-validation (retinal scan, fingerprint analysis, etc.), card-key, or mechanical key, may also be used in combination with or in lieu of traditional log in procedures.

The core/Authority then receives a certificate request from the console 252. Contained in the request is the public key created at the console computer.

In response, a typical X.509 certificate is created 254 by the core. In addition to standard public key 258 and identity attributes 262, the core places the console operator's username 256 and group affiliation 260 in the certificates extended data area 154 (FIG. 2).

In one embodiment, a certificate may contain a field indicating unbounded access privileges, e.g., the console operator has "super user" or administrator rights for all manageable devices. This "super user" attribute would trigger the manageable device to bypass the standard access control list cross-check phase, and treat the certificate owner as if it has rights to perform any action. In this case, the "super user" certificate not only represents identity of an operator to a manageable device, but it also represents the authorization to perform any task. This type of certificate is atypical of other session certificates, not only because of it's "super user" status. This is because a typical certificate only contains identity information, and no access control information. Access control information is typically delivered directly from the core to the manageable device during configuration of the manageable device.

A configuration option at the core/certificate authority would specify which login account should trigger the creation of a "super user" certificate. If 264 the core determines that the "super user" attribute should be inserted, it does so 266. It adds any other identity attributes to the certificate, then signs the certificate as any other 268.

The signed session certificate is then granted 270, e.g., sent, to the requesting console operator.

Figure 6:
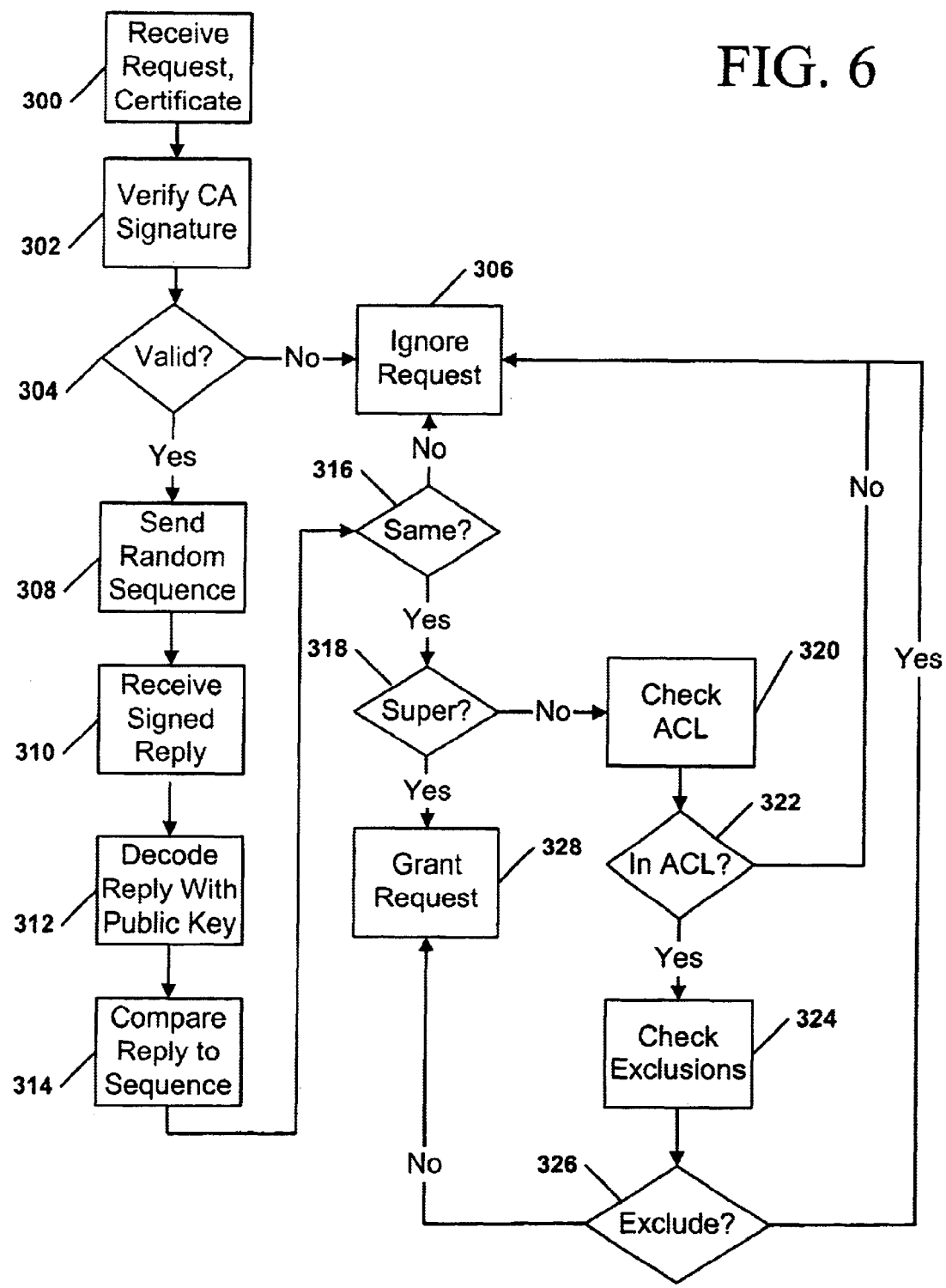
FIG. 6 is a flowchart for a manageable device testing a request received from a console operator.

FIG. 6 is a flowchart for a manageable device testing a request received from a console operator. At this point, a console operator has already contacted a core, proven identity (e.g., by the core checking the operator's login identity on the operator's console), and received a signed certificate allowing the operator to communicate with a particular manageable device. A manageable device receives 300 the request along with a session certificate.

The manageable device then verifies 302 that a trusted certificate authority associated with a core has signed the session certificate. Verification can be accomplished by using the issuer fields in the session certificate to lookup the certificate authority's certificate and verify that the session certificate was signed by the private key of the certificate authority (the core). Signature validation can be accomplished through application of known hash-check analysis on the signature, or by other techniques according to the nature of the signature. If 304 signature validation fails, then the manageable device ignores 306 all requests from the console. In one embodiment, the manageable device also sends an intruder detection warning to the core.

The manageable device can also verify that the console operator has the private key associated with the public key embedded within the received session certificate. This can be accomplished by sending a random sequence 308 to the core, and asking the core to sign the sequence with its private key. The signed reply is received 310 by the manageable device, and the signature decoded 312 with the node's copy of the public key, and compared 314 against the original sequence. If 316 the comparison fails, then the manageable device ignores 306 all requests from the console. Additional verifications can be implemented as well, such as embedding destination and sequence information in requests. The random number challenge, combined with session specific request information prevents eavesdropper attacks, where someone records a valid session and later plays it back to the same or different manageable device.

Note that, as discussed above, there may be a "super user" certificate, which indicates a particular operator (the owner of the certificate) is authorized to perform any action. Thus, if 316 the comparison 314 did not fail, then a check is made to determine if 318 the operator is a "super user." If so, this instructs the manageable device to skip access control list validation and immediately grant 328 any request. Otherwise, the manageable device verifies that the operator identified by the session certificate is authorized to perform the requested operation, or authorized to access the desired resource, by checking 320 the operator's identity information in the session certificate against local (or remote) access control lists.

As discussed above, access control lists identify which operators are authorized to perform what actions, and may be inclusive or exclusionary. If 322 the operator is authorized to act, an exclusion list may also be checked 324 to determine whether the operator has been excluded from performing. Exclusion lists can be used to temporarily (or permanently) prevent a certain operator or request from being performed on a particular manageable device, even though it might otherwise be valid.

In one embodiment, manageable device-based access control lists are configured at node installation time and later updated by anyone with access privilege to the access control list system, perhaps via a policy-based configuration mechanism. In this embodiment, to modify an access control list on a manageable device, a console operator must first be "authorized" for such access. In other words, the operator must be within an access control list used to control modifications to access control lists (e.g., a "CanEditACL" list). Or, the operator must present a "super user" certificate. It is possible to lock down a manageable device by ensuring that every management access control list is empty. In such a "locked down" state, no one but the "super user" can perform any action on the manageable device.

If 326 the operator (or request) is not excluded, then the manageable device grants 328 the request and performs the requested operation or gives access to the requested resource.

Figure 7:
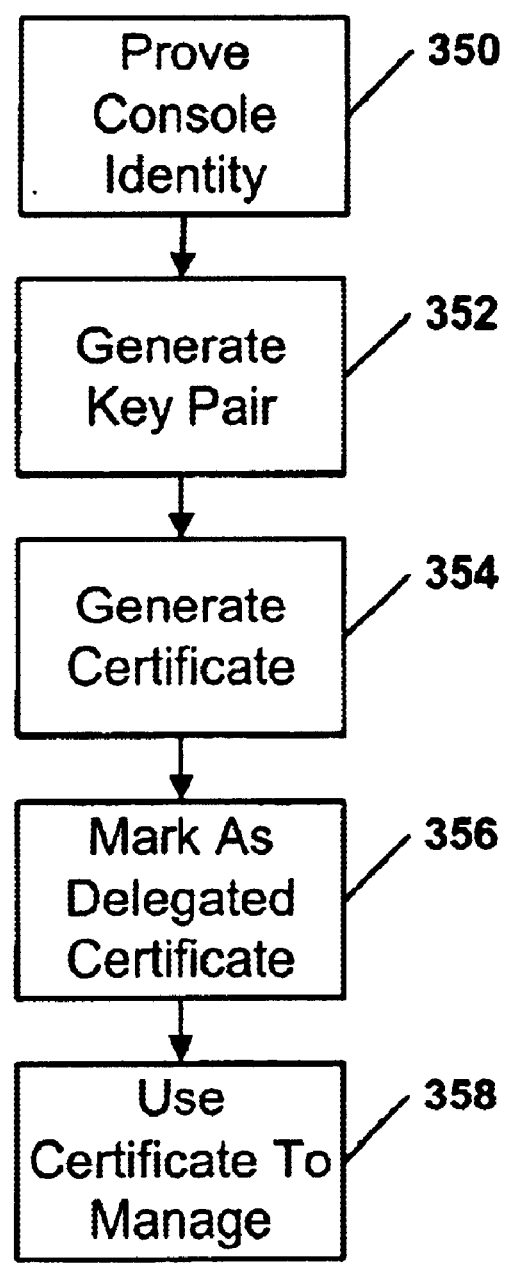
FIG. 7 is a flowchart illustrating authorization delegation performed at a core.

FIG. 7 is a flowchart illustrating authorization delegation to allow a core to act as a proxy for a console operator. In one embodiment, a core can provide functionality for an operator, where the functionality is performed by the core in the stead of the operator.

To do so, a console (or other requestor) authenticates 350 to the core as described previously, then asks the core to perform some function on its behalf, such as to deploy software to a group of manageable devices. The core then mimics the identity of the operator by creating a session certificate containing the operator's identify information, and contacting each. manageable device to perform the requested action.

The core does this by generating 352 a key pair and requesting that the local certificate authority generate 354 a session certificate using the key pair and identity operator information proven in step one.

This certificate is then marked 356 as a delegate certificate, and adds information in the additional information section of the certificate (see FIG. 3) identifying the source of authority and delegation. The resulting session certificate can be used by the core to manage a manageable device 358 as session certificates would be used by a console operator.

Figure 8:
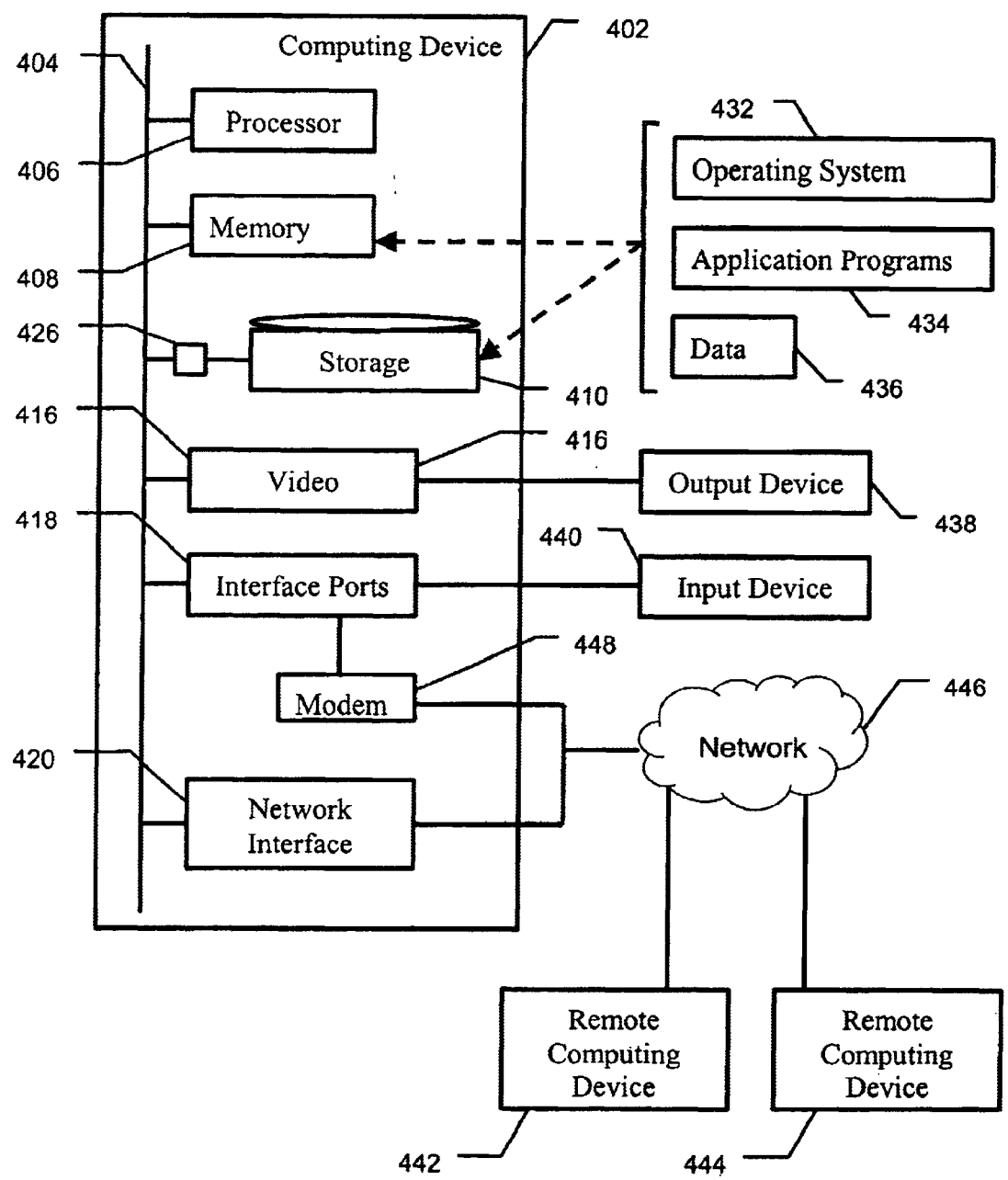
FIG. 8 illustrates a suitable computing environment in which portions of the invention may be implemented.

FIG. 8 and the following discussion are intended to provide a brief, general description of a suitable computing environment in which portions of the invention may be implemented. The invention may be described by reference to different high-level program modules and/or low-level hardware contexts. Those skilled in the art will realize that program module references can be interchanged with low-level instructions.

Program modules include procedures, functions, programs, components, data structures, and the like, that perform particular tasks or implement particular abstract data types. The modules may be incorporated into single and multi-processor computing systems, as well as hand-held devices and controllable consumer devices. It is understood that modules may be implemented on a single computing device, or processed over a distributed network environment, where modules can be located in both local and remote memory storage devices.

An exemplary system for implementing the invention includes a computing device 402 having system bus 404 for coupling together various components within the computing device. The system 404 bus may be any of several types of bus structures, such as PCI, AGP, VESA, Microchannel, ISA and EISA, etc. Typically, attached to the bus 402 are processors 406 such as Intel, DEC Alpha, PowerPC, programmable gate arrays, etc., a memory 408 (e.g., RAM, ROM), storage devices 410, a video interface 416, input/output interface ports 418, and a network interface 420. It is understood that a modem 448 may operate in conjunction with an input port 418 to operate an alternative network interface. The storage systems and associated computer-readable media provide storage of data and executable instructions for the computing device 402. Note that storage options include hard-drives, floppy-disks, optical storage, magnetic cassettes, tapes, flash memory cards, memory sticks, digital video disks, and the like.

The exemplary computing device 402 can store and execute a number of program modules within the memory 408 and storage devices 410, and cause changes to data 436. Typical program modules include an operating system 432, and application programs 434 such as a web browser configured to seek authorization for an operator to manage a device on a network. The computing device 402 is expected to operate in a networked 446 environment using logical connections to one or more remote computing devices 442, 444. For example, assuming a perspective of an operator's console as device 402, remote computing devices 442, 444 include cores, certificate authorities, and manageable devices, as well as a web server or other program module utilizing a network application protocol (e.g., HTTP, File Transfer Protocol (FTP), Gopher, Wide Area Information Server (WAIS)), a router, a peer device or other common network device.

It is understood that a remote computing device can be configured like computing device 402, and therefore may include many or all of the elements discussed for computing device 402. It should also be appreciated that remote computing devices 442 may be embodied separately, or combined within a single device; for example, a core and certificate authority may be combined into a single device which coordinates a console operator's access to a particular manageable device.

Having described and illustrated the principles of the invention with reference to illustrated embodiments, it will be recognized that the illustrated embodiments can be modified in arrangement and detail without departing from such principles. For example, while the foregoing description focused—for expository convenience—on validating console attempts to remotely manage a manageable device, it will be recognized that the same techniques and analyses discussed above can be applied to providing secure (e.g., verified) communication in different contexts.

Even though the foregoing discussion has focused on particular embodiments, it is understood that other configurations are contemplated. In particular, even though the expressions "in one embodiment" or "in another embodiment" are used herein, these phrases are meant to generally reference embodiment possibilities, and are not intended to limit the invention to those particular embodiment configurations. Disclosed embodiments, unless indicated otherwise are combinable into further embodiments.

Consequently, in view of the wide variety of permutations to the above-described embodiments, the detailed description is intended to be illustrative only, and should not be taken as limiting the scope of the invention. Rather, what is claimed as the invention, is all such modifications as may come within the scope and spirit of the following claims and equivalents thereto.

What is claimed is:

1. An operating system independent method for an operator of a console to manage a device with a single authentication of the operator to a core, comprising:
   obtaining a short-lived operating system independent session certificate from a core to authenticate operator identity and operator group membership;
   providing the operating system independent session certificate along with a management request to a device; and
   determining whether the authenticated operator has necessary access privilege to perform the management request based at least in part on comparing said operator group membership to an access control list of the device.

2. The method of claim 1, wherein the console executes a first operating system, the core executes a second operating system, and the device executes a third operating system, and wherein at least two of said three operating systems utilize incompatible user authentication arrangements.

3. The method of claim 1, wherein determining necessary access privilege includes comparing said operator identity to said access control list.

4. The method of claim 1, wherein the device maintains a management policy restricting management requests the authenticated operator has necessary privilege to perform.

5. The method of claim 4, wherein the core instructs the device to revise selected ones of its access control list and management policy.

6. The method of claim 1, further comprising:
   opening a communication link to the device; and
   requesting the device identify at least one core for the device;
   wherein the short-lived operating system independent session certificate is obtained from a first one of the least one core for the device.

7. The method of claim 1, wherein if the short-lived operating system independent session certificate cannot be obtained from the core, the method further comprising:
   preparing a non-authenticated session certificate including operator identity and operator group membership on the console; and
   transmitting the non-authenticated session certificate to the device.

8. A storage medium having encoded thereon instructions to facilitate an operator of a console to manage a device with only one authentication of the operator to a core, said instructions capable of directing a processor to:
   obtain a short-lived operating system independent session certificate from a core to authenticate operator identity and operator group membership;
   provide the operating system independent session certificate along with a management request to a device; and
   determine whether the authenticated operator has necessary access privilege to perform the management request based at least in part on comparing said operator group membership to an access control list of the device.

9. The storage medium of claim 8, said instructions further including instructions to direct said processor to:
   compare said operator identity to said access control list; and
   compare said management request to a management policy restricting management requests the authenticated operator has necessary privilege to perform.

10. In a heterogeneous operating system environment, a method for a device running a first operating system to validate a management request from an operator of a console running a different operating system, comprising:
    receiving, by the device, of an X.509 based session certificate including:
      a first field encoding an identity of the operator;
      a second field encoding group membership for the operator;
      a third field indicating an issuer of said certificate; and
      a fourth field for storing a signature by said issuer for said certificate;
    receiving a request to manage the device;
    confirming the issuer of said certificate is a trusted certificate authority;
    verifying the trusted certificate authority signed said certificate, and if verifying fails, then ignoring the request to manage;
    verifying authorization of the console operator to perform the request to manage; and
    verifying the management request complies with a local policy.

11. The method of claim 10, in which the device maintains a list of allowed management activities, the method further comprising:
    confirming the request is in the list of allowed management activities.

12. The method of claim 10, further comprising:
    comparing the issuer to a local list of trusted certificate authorities, and if the issuer is unlisted, then ignoring the request.

13. A method according to claim 10 for validating the issuer of the session certificate against data maintained by a certificate store, the method further comprising:
    retrieving an identity certificate for the issuer from a certificate store, said retrieved certificate having embedded public key P, and corresponding private key Q known to the issuer;
    generating a unique data sequence X;
    for an encryption function E( ), computing W=E(P, X);
    transmitting W to the issuer;
    receiving a data sequence Y from the issuer; and
    for a decryption function D( ), computing D(P, Y); and
    comparing X=D(Q, Y);
    wherein the issuer is validated if the comparing is true.

14. The method of claim 13, further comprising:
    computing Y=D(Q, W); and
    transmitting E(Q, Y) to the device.

15. The method of claim 10, in which management requests have a request type, and where there is an access control list for each request type, the method further comprising:
    opening an access control list corresponding to the management request;
    searching said access control list for said identity of the operator; and
    ignoring said request to manage the device if said searching fails.

16. The method of claim 15, further comprising:
    opening an exclusion access control list maintained by the device, said exclusion list listing excluded management requests; and verifying absence of the request to manage from said exclusion list.

17. In a heterogeneous networked operating system environment, a method for an operator of a console to manage a device, comprising:

creating a temporary encryption and a decryption key pairing;

identifying a core for said device to be managed;

requesting, by the operator of the console, a signed short-lived session certificate from the core identifying the operator and authorizing the operator to manage the device;

receiving, from the core, said session certificate;

submitting said received session certificate to the device to initiate a management session; and validating, by the device, said session certificate; and accepting, by the device, of the management session if said session complies with a management policy maintained by the device.

18. In a heterogeneous networked operating system environment, a method for an operator of a console to manage a device, comprising:

means for creating a temporary encryption and a decryption key pairing;

means for identifying a core for said device to be managed;

means for requesting, by the operator of the console, a signed short-lived session certificate from the core identifying the operator and authorizing the operator to manage the device;

means for receiving, from the core, said session certificate;

means for submitting said received session certificate to the device to initiate a management session; and means for validating, by the device, said session certificate; and means for accepting, by the device, of the management session if said session complies with a management policy maintained by the device.

* * * * *